US011321110B1

(12) United States Patent
Anderson et al.

(10) Patent No.: US 11,321,110 B1
(45) Date of Patent: May 3, 2022

(54) VIRTUAL NETWORK FOR VIRTUAL MACHINE COMMUNICATION AND MIGRATION

(71) Applicant: Google LLC, Mountain View, CA (US)

(72) Inventors: Evan K. Anderson, Seattle, WA (US); Cristian Petrescu-Prahova, Seattle, WA (US); Joseph S. Beda, III, Seattle, WA (US)

(73) Assignee: Google LLC, Mountain View, CA (US)

( * ) Notice: Subject to any disclaimer, the term of this patent is extended or adjusted under 35 U.S.C. 154(b) by 161 days.

(21) Appl. No.: 16/298,352

(22) Filed: Mar. 11, 2019

Related U.S. Application Data

(63) Continuation of application No. 13/186,293, filed on Jul. 19, 2011, now Pat. No. 10,228,959.

(60) Provisional application No. 61/492,708, filed on Jun. 2, 2011.

(51) Int. Cl.
G06F 9/455 (2018.01)
G06F 9/50 (2006.01)

(52) U.S. Cl.
CPC ........ G06F 9/45558 (2013.01); G06F 9/5077 (2013.01)

(58) Field of Classification Search
None
See application file for complete search history.

(56) References Cited

U.S. PATENT DOCUMENTS 5,463,768 A 10/1995 Cudihy et al.
6,598,179 B1 7/2003 Chirashnya et al.
6,891,839 B2 5/2005 Albert et al.
7,062,718 B2 6/2006 Kodosky et al.
7,117,243 B2 10/2006 Peart
7,289,442 B1 * 10/2007 Srinivasan .......... H04L 41/0896
370/230

(Continued)

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

Primary Examiner — Lewis A Bullock, Jr.
Assistant Examiner — Melissa A Headly
(74) Attorney, Agent, or Firm — Hongman LLP; Brett A. Krueger

(57) ABSTRACT

Systems and techniques are described for virtual machine communication and migration. A described technique includes operating server systems that are configured to run virtual machines and providing a virtual network for Internet Protocol (IP) based communications to the virtual machines. The virtual machines can be assigned network addresses, such as IP addresses, on the virtual network. Providing the virtual network can include using separate IP tunnels to effect delivery of IP packets on the virtual network to the virtual machines, respectively. The technique includes migrating a virtual machine running on a first server system to a second server system. The migrated virtual machine can maintain its assigned IP address. The technique includes updating a tunnel endpoint destination associated with the assigned IP address of the migrated virtual machine. The updated tunnel endpoint destination can be based on a network address associated with the second server system.

17 Claims, 9 Drawing Sheets

(56) References Cited

U.S. PATENT DOCUMENTS

| | | | |
|---|---|---|---|
| 7,613,809 | B2 | 11/2009 | Jackson et al. |
| 7,650,331 | B1 | 1/2010 | Dean et al. |
| 7,653,833 | B1 | 1/2010 | Miller et al. |
| 7,761,573 | B2 | 7/2010 | Travostino et al. |
| 7,804,862 | B1 | 9/2010 | Olson et al. |
| 8,146,147 | B2 | 3/2012 | Litvin et al. |
| 8,484,353 | B1 | 7/2013 | Johnson et al. |
| 8,533,343 | B1 | 9/2013 | Beda et al. |
| 2004/0139368 | A1 | 7/2004 | Austen et al. |
| 2005/0166011 | A1 | 7/2005 | Burnett et al. |
| 2006/0161753 | A1 | 7/2006 | Aschoff et al. |
| 2007/0180436 | A1* | 8/2007 | Travostino ............ H04L 67/34 717/138 |
| 2007/0199058 | A1 | 8/2007 | Baumgart et al. |
| 2007/0271604 | A1 | 11/2007 | Webster et al. |
| 2007/0280243 | A1 | 12/2007 | Wray et al. |
| 2008/0086515 | A1 | 4/2008 | Bai et al. |
| 2008/0184225 | A1 | 7/2008 | Fitzgerald et al. |
| 2008/0205415 | A1 | 8/2008 | Morales |
| 2008/0215796 | A1 | 9/2008 | Lam et al. |
| 2009/0024758 | A1* | 1/2009 | Levy-Abegnoli ... H04W 12/122 709/237 |
| 2009/0097657 | A1 | 4/2009 | Schiedt et al. |
| 2009/0199177 | A1 | 8/2009 | Edwards et al. |
| 2009/0222815 | A1 | 9/2009 | Dake |
| 2009/0241108 | A1 | 9/2009 | Edwards et al. |
| 2009/0249440 | A1 | 10/2009 | Platt et al. |
| 2009/0300605 | A1 | 12/2009 | Edwards et al. |
| 2010/0057913 | A1 | 3/2010 | DeHaan |
| 2010/0071035 | A1 | 3/2010 | Budko et al. |
| 2010/0107162 | A1 | 4/2010 | Edwards et al. |
| 2010/0199089 | A1 | 8/2010 | Vysogorets et al. |
| 2010/0257269 | A1 | 10/2010 | Clark |
| 2010/0287548 | A1 | 11/2010 | Zhou et al. |
| 2011/0022812 | A1 | 1/2011 | van der Linden et al. |
| 2011/0055361 | A1 | 3/2011 | DeHaan |
| 2011/0153838 | A1 | 6/2011 | Belkine et al. |
| 2011/0214176 | A1* | 9/2011 | Burch ................ G06F 9/45533 726/15 |
| 2011/0231280 | A1 | 9/2011 | Farah |
| 2011/0258441 | A1 | 10/2011 | Ashok et al. |
| 2011/0292931 | A1* | 12/2011 | Kizawa ................ H04L 45/586 370/354 |
| 2012/0002535 | A1* | 1/2012 | Droux ................ G06F 9/45558 370/216 |
| 2012/0185688 | A1 | 7/2012 | Thornton |

OTHER PUBLICATIONS

Primet, Pascale, et al.., "HIPCAL: State of the Art of OS and Network virtualization solutions for Grids", Sep. 14, 2007, 38 pages.

Wikipedia, "IPSec", [online] [retrieved on Jan. 4, 2011]. Retrieved from the Internet: <URL: http://en.wikipedia.org/wiki/IPsec/>, 8 pages.

Abdull, Alastairirvine, et al. "Generic Routing Encapsulation", [online] [retrieved on Jan. 4, 2011]. Retrieved from the Internet: <URL: http:/ / creativecommons. org/ licenses/ by-sa/ 3. 0/>, 5 pages.

Farinacci et al., "RFC 2784: Generic Routing Encapsulation (GRE)", Mar. 2000, The Internet Society, 10 pages.

Kent et al., "RFC 4301: Security Architecture for the Internet Protocol", Dec. 2005, The Internet Society, 102 pages.

Wikipedia, "Domain Name System". [online] [Retrieved on Feb. 4, 2012]. Retrieved from the Internet: <URL: http://en.wikipedia.org/wiki/Domain_Name_System>, 16 pages.

Bucket Explorer. "What is my AWS Access and Secret Key." [Retrieved Apr. 26, 2011]. Retrieved from the Internet <URL: http://www.bucketexplorer.com/documentation/amazon-s3-what-is-my-aws-access-and-secret-key.html>, 1 page.

Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.

Myerson, Judith. "Creating Applications with Amazon EC2 and S3." O'ReillyOnLamp.com, May 13, 2008 [Retrieved on Apr. 26, 2011], Retrieved from the Internet <URL: http://onlamp.com/pub/a/onlamp/2008/05/13/creating-applications-with-amazon-ec2-and-s3.html>, 8 pages.

Wikipedia. "OAuth." [online] [Retrieved on Jan. 20, 2011]. Retrieved from the Internet <URL: http://en.wikipedia.org/wiki/OAuth> , 3 pages.

Gowalla. "API Documentation—Oauth." [Retrieved on Apr. 26, 2011]. Retrieved from the Internet <URL: http://gowalla.com/api/docs/oauth>, 4 pages.

Apache HTTP Server Version 2.0. "Log Files." [Retrieved on Feb. 15, 2011]. Retrieved from the Internet <URL: http://httpd.apache.org/docs/2.0/logs.html>, 7 pages.

Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.

MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.

Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.

Wikipedia., Anycast [Retrieved on Oct. 10, 2011] Retrieved from the Internet: URL<http://en.wikipedia.org/wiki/Anycast>, 5 pages.

VMCI Overview [Retrieved on Jun. 8, 2011] Retrieved from the Internet: <URL: http://pubs.vmware.com/vmci-sdk/VMCI_intro.html>, 3 pages.

VMware vSphere [Retrieved on Jun. 8, 2011] Retrieved from the Internet: <URL: http://www.vmware.com/products/vmotion/overview.html>, 2 pages.

Travostino, Franco, et al., Seamless Live Migration of Virtual Machines over the MAN/WAN, 2006, Elsevier Future Generation Computer Systems 2006, 10 pages.

VMCI Datagram API [Retrieved on Jun. 8, 2011], Retrieved from the Internet: <URL: http://pubs.vmware.com/vmci-sdk/datagram.html>, 1 page.

VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.

VMCIDs_Lookup [Retrieved on Jun. 8, 2011], Retrieved from the Internet: <URL: http://pubs.vmware.com/vmci-sdk/functions/VMCIDs_Lookup.html>, 2 pages.

Chen, Per M., et al., : "Maximizing Performance in a Striped Disk Array", 17th Annual International Symposium on Computer Architecture (SIGARCH 1990), 18 pages.

Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.

Vazhkudai, Sudharshan S., et al.; "Constructing Collaborative Desktop Storage Caches for Large Scientific Datasets"; ACM Journal Name, vol. V, No. N, Jun. 2006, 34 pages.

OMG, Deployment and Configuration of Component-based Distributed Applications Specification—Version 4.0, OMG, 2006, pp. 1-160.

Cala et al., "Automatic Software Deployment in the Azure Cloud", IFIP International Federation for Information Processing, 2010, pp. 1-14.

RSA Laboratories, "PKCS #11 v2.20: Cryptographic Token Interface Standard," Jun. 28, 2004, RSA Security Inc. (407 pages).

Amazon Auto Scaling—Getting Started Guide—API Version Aug. 1, 2010. Amazon Web Services LLC, 2010, 20 pages.

Amazon Auto Scaling—Developer Guide—API Version Aug. 1, 2010. Amazon Web Services LLC, 2011, 62 pages.

Amazon CloudWatch—Developer Guide—API Version Aug. 1, 2010. Amazon Web Services LLC, 2010, 75 pages.

Benincosa. "Ganglia and Nagios, Part 2: Monitor enterprise clusters with Nagios—Install Nagios to effectively monitor a data center; make Ganglia and Nagios work together," 2009, 20 pages.

(56) References Cited

OTHER PUBLICATIONS

'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.

'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.

'Zabbix' [online]. "Zabbix 1.8: The Ultimate Open Source Monitoring Solution," 2001-2012, [retrieved on Feb. 3, 2011]. Retrieved from the Internet: URL: < http://www.zabbix.com/features.php.> 1 page.

Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.

Paravirtualization, Wikipedia Article, downloaded from http://en.wikipedia.org/wiki/Paravirtualization on Mar. 18, 2012.

Paravirtualized File Systems, Eric Van Hensbergen, downloaded from http://www.slideshare.net/ericvh/9p-on-kvm on Mar. 18, 2012.

"IPsec". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-8.

"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-5.

Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.

How To: Getting Started With Amazon EC2, Paul Stamatiou, Apr. 5, 2008. Retrieved from the Internet: <URL:http//paulstamatiou.com/how-to-getting-started-with-amazon-ec2>, 25 pages.

Uploading Personal ssh Keys To Amazon EC2, Eric Hammond, Oct. 14, 2010. Retrieved from the Internet: <URL:http://alestic.com/2010/10/ec2-ssh-keys>, 3 pages.

Key Management in Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.

Managing Amazon EC2—SSH Login and Protecting Your Instances, Everyday's Findings, Monday, May 18, 2009, Retrieved from the Internet on Nov. 18, 2011; Retrieved from: <URL: http://blog.taggesell.de/index.php?/aarchives/73-Managing-Amazon-EC2., 6 pages.

Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.

Live Migration of Virtual Machines, Clark et al., University of Cambridge Laboratory, Department of Computer Science; University of Copenhagen, Denmark, 2005; 14 pages.

Making Services Easy to Migrate, Debian Administration, System Administration Tips and Resources, Jan. 1, 2005, 5 pages.

Seamless Live Migration of Virtual Machines Over the MAN/WAN, Franco Travostino et al., 2006, Elsevier Future Generation Computer Systems, 10 pages.

L. Gommans, et al., Token-Based Authorization of Connection Oriented Network Resources, 1st International Workshop on Networks for Grid Applications (GridNets 2004), Oct. 29, 2004; 8 pages.

Cabellos et al., LISPmob: Mobile Networking through LISP, Apr. 2, 2012, 8 pages.

\* cited by examiner

|              | Virtual Network | Internet             |
|--------------|-----------------|----------------------|
| VM Identifier | IP Address      | IP Address & Port    |
| VM-1         | 192.168.1.10    | 134.130.78.11 -- 1040 |
| VM-7         | 192.168.1.15    | 134.130.78.11 -- 1035 |
| VM-13        | 192.168.1.20    | 224.10.202.6 -- 1040 |
| VM-21        | 192.168.1.25    | 224.10.202.6 -- 1050 |

FIG. 7A

|              | Virtual Network | Internet             |
|--------------|-----------------|----------------------|
| VM Identifier | IP Address      | IP Address & Port    |
| VM-1         | 192.168.1.10    | 134.130.78.11 -- 1040 |
| VM-7         | 192.168.1.15    | 224.10.202.6 -- 1060 |
| VM-13        | 192.168.1.20    | 224.10.202.6 -- 1030 |
| VM-21        | 192.168.1.25    | 224.10.202.6 -- 1050 |

FIG. 7B

VIRTUAL NETWORK FOR VIRTUAL MACHINE COMMUNICATION AND MIGRATION

PRIORITY CLAIM

This patent document is a continuation of U.S. patent application Ser. No. 13/186,293, filed Jul. 19, 2011, which claims the benefit of the priority of U.S. Provisional Application Ser. No. 61/492,708, filed Jun. 2, 2011, the contents of each are incorporated by reference herein.

BACKGROUND

This patent document relates to virtual machine communications.

Cloud computing is network-based computing in which typically large collections of servers housed in data centers or "server farms" provides computational resources and data storage as needed to remote end users. Some cloud computing services allow end users to run user-provided server software applications (e.g., e-commerce server application, web server, or file server) in the cloud. Some other cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on the server farm may simplify management of end user computing devices. Some cloud computing services allow end users to execute software applications in virtual machines.

SUMMARY

In general, one aspect of the subject matter described in this document can be embodied in a technique that can include operating server systems that are configured to run virtual machines and providing a virtual network for Internet Protocol (IP) based communications to the virtual machines. The virtual machines can be assigned IP addresses on the virtual network. Providing the virtual network can include using separate IP tunnels to effect delivery of IP packets on the virtual network to the virtual machines, respectively. The technique can include migrating a virtual machine running on the first server system to the second server system. The migrated virtual machine can maintain its assigned IP address. The technique can include updating a tunnel endpoint destination associated with the assigned IP address of the migrated virtual machine. The updated tunnel endpoint destination can be based on a network address associated with the second server system. Other embodiments of this aspect include corresponding systems, apparatus, and computer programs encoded on computer storage devices.

These and other aspects can optionally include one or more of the following features. Providing the virtual network can include using a first network agent to encapsulate an IP packet sent by a first virtual machine of the virtual machines and to send the encapsulated IP packet via an IP tunnel. Providing the virtual network can include using a second network agent to receive the encapsulated IP packet via the IP tunnel and to deliver a version of the encapsulated IP packet to a second virtual machine of the virtual machines. In some cases, the first virtual machine and the second virtual machine run on the first server system. In some cases, the second virtual machine is the migrated virtual machine, where a destination address of the encapsulated IP packet is based on the updated tunnel endpoint destination.

Migrating the virtual machine can include operating the first server system to continue to receive one or more inbound IP packets via the virtual network for the migrated virtual machine and operating the first server system to send the one or more inbound IP packets to the migrated virtual machine using an IP tunnel that is based on the updated tunnel endpoint destination. Migrating the virtual machine can include sending virtual machine state information associated with the migrated virtual machine to the second server system; and operating the second server system to resume operations of the migrated virtual machine using the virtual machine state information.

Implementations can include detecting a reduced processing capacity at the first server system, where migrating the virtual machine is responsive to the detected reduced processing capacity. Implementations can include detecting a hardware failure on the first server system, where migrating the virtual machine is responsive to the detected hardware failure. Implementations can include receiving a migration command, where migrating the virtual machine is responsive to the migration command. In some implementations, the second server system runs a backup virtual machine that is synchronized to the virtual machine running on the first server system, and where migrating the virtual machine can include activating the backup virtual machine. The first server system and the second server system can reside in different geographic locations.

A system can include a controller and server systems that are configured to run virtual machines that communicate on a virtual network, the virtual machines being assigned IP addresses on the virtual network, where the server systems use separate IP tunnels to effect delivery of IP packets on the virtual network to the virtual machines, respectively, where the server systems include a first server system and a second server system. The controller configured to migrate a selected virtual machine running on the first server system to the second server system, the migrated virtual machine maintaining an assigned IP address, where the controller is configured to update a tunnel endpoint destination associated with the assigned IP address of the migrated virtual machine, the updated tunnel endpoint destination being based on a network address associated with the second server system.

In some implementations, the first server system is configured to use a first network agent to encapsulate an IP packet sent by a first virtual machine of the virtual machines and to send the encapsulated IP packet via an IP tunnel, and the second server system is configured to use a second network agent to receive the encapsulated IP packet via the IP tunnel and to deliver a version of the encapsulated IP packet to a second virtual machine of the virtual machines. In some implementations, the first virtual machine and the second virtual machine run on the first server system. In some implementations, the second virtual machine is the migrated virtual machine, where a destination address of the encapsulated IP packet is based on the updated tunnel endpoint destination.

The first server system can be configured to continue to receive one or more inbound IP packets via the virtual network for the migrated virtual machine, and send the one or more inbound IP packets to the migrated virtual machine using an IP tunnel that is based on the updated tunnel endpoint destination. The second server system can be configured to receive virtual machine state information associated with the selected virtual machine, and resume operations of the selected virtual machine using the virtual machine state information. In some implementations, the second server system runs a backup virtual machine that is synchronized to the selected virtual machine and activates the backup virtual machine as the migrated virtual machine. In some implementations, the first server system includes at least a portion of the controller. The first server system and the second server system can reside in different geographic locations.

The controller can be configured to detect a reduced processing capacity at the first server system, where the selected virtual machine is selected based on the detected reduced processing capacity. In some implementations, the controller is configured to perform a virtual machine migration based on detecting a hardware failure on the first server system. In some implementations, the controller is configured to perform a virtual machine migration based on receiving a migration command.

In another aspect, a system can include server systems that are configured to run virtual machines that communicate on a virtual network, the virtual machines being assigned network addresses on the virtual network, where the server systems use separate tunnels to effect delivery of packets on the virtual network to the virtual machines, respectively, where the server systems include a first server system and a second server system. In some implementations, the server systems are configured to migrate a selected virtual machine running on the first server system to the second server system, the migrated virtual machine maintaining its assigned network address on the virtual network. The server systems can be configured to update a tunnel endpoint destination associated with the assigned network address of the migrated virtual machine, the updated tunnel endpoint destination being based on a network address associated with the second server system.

Particular embodiments of the subject matter described in this document can be implemented so as to realize one or more of the following advantages. A virtual network can provide a virtual communication medium to connect virtual machines that are running on one or more server systems. The virtual network, which can be distributed over geographically separated locations, can provide a virtual machine communication medium that is independent of physical location. Virtual machines on the virtual network can be migrated between different server systems that respectively reside in geographically separated locations. Migrated virtual machines can resume communications on the virtual network with little or no communication disruption (e.g., virtual network traffic can be rerouted to the new server system location of a migrated virtual machine).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7A shows a before-migration snapshot of a virtual network routing table.

FIG. 7B shows an after-migration snapshot of a virtual network routing table.

Like reference numbers and designations in the various drawings indicate like elements.

DETAILED DESCRIPTION

Figure 1A:
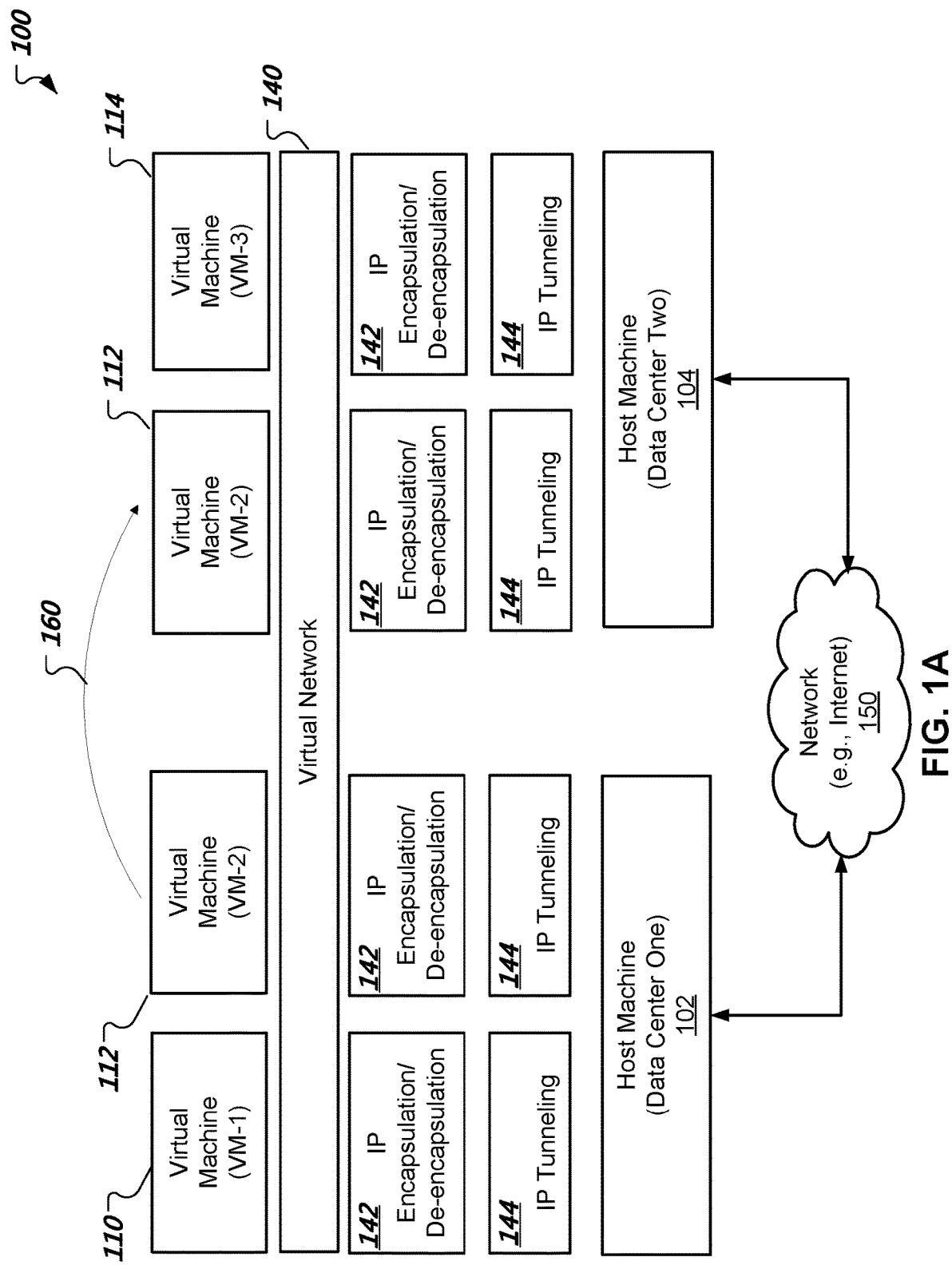
FIG. 1A shows an example of a distributed system that runs multiple virtual machine instances over a geographically distributed virtual network.

FIG. 1A shows an example of a distributed system that runs multiple virtual machine instances over a geographically distributed virtual network. A distributed system 100 can run virtual machines (VMs) 110, 112, 114, on host machines 102, 104. Elements of the distributed system 100 can reside in different physical locations. For example, a first host machine 102 can reside in a first data center, while a second host machine 104 can reside in a second data center. In some implementations, these data centers can be located in different states, countries, or both.

The distributed system 100 can provide a virtual network 140 to the virtual machines 110, 112, 114 for Internet Protocol (IP) based communications. The VMs 110, 112, 114 are assigned network addresses (e.g., an IPv4 address or IPv6 address) that are routable on the virtual network 140. In some implementations, the virtual network 140 includes a private subnet (e.g., 192.168.0.0/16, 10.0.0.0/8).

IP traffic on the virtual network 140 is carried by IP tunnels. Host machines 102, 104 perform IP encapsulation and de-encapsulation 142 for IP traffic to and from each VM 110, 112, 114. Encapsulated IP traffic from one VM is sent to another VM via IP tunneling 144. An IP tunnel provides a transport layer. For example, IP tunneling can include sending an IP tunnel packet that includes an encapsulated packet. The encapsulated packet can be an IP packet. Other types of encapsulated packets are possible. In some cases, an IP tunnel can both originate and terminate on the same host machine (e.g., source and destination VMs are on the same host machine). In some cases, an IP tunnel can originate at one host machine and terminate at a different host machine (e.g., source and destination VMs are on different host machines). IP tunnel traffic between the host machines 102, 104 can be carried over a virtual private network (VPN) via a network 150 such as the Internet.

Host machines 102, 104 can use a virtual network routing table to retrieve the endpoint locations of the IP tunnels. In some implementations, based on an input VM identifier or VM IP address, a virtual network routing table provides a routable IP address on network 150 that corresponds to the host machine that runs the VM associated with the input VM identifier or VM IP address.

Based on the virtual network 140 spanning multiple host machines 102, 104 in geographically separate areas, VM migration can occur with minimal or zero disruption to IP traffic from or to a VM migrated that has been migrated between geographically separate areas. For example, a VM 112 can be migrated 160 from a first host machine 102 at a first location to a second host machine 104 at a second location. Endpoints for the tunnels associated with VM 112 can be updated to reflect the change in host machine. In some implementations, the host machines 102, 104 can run multiple virtual networks. For example, two virtual machines can be on the same physical machine, but attached to different virtual networks. Furthermore, a virtual machine can have one or more virtual network interface cards (NICs) that are attached to one or more virtual networks. Each virtual network interface can be assigned a network address (e.g., IPv4 address, IPv6 address, or a layer 2 Media Access Control address). In some implementations, a virtual machine stores virtual network addresses and their associated network identifiers.

Figure 1B:
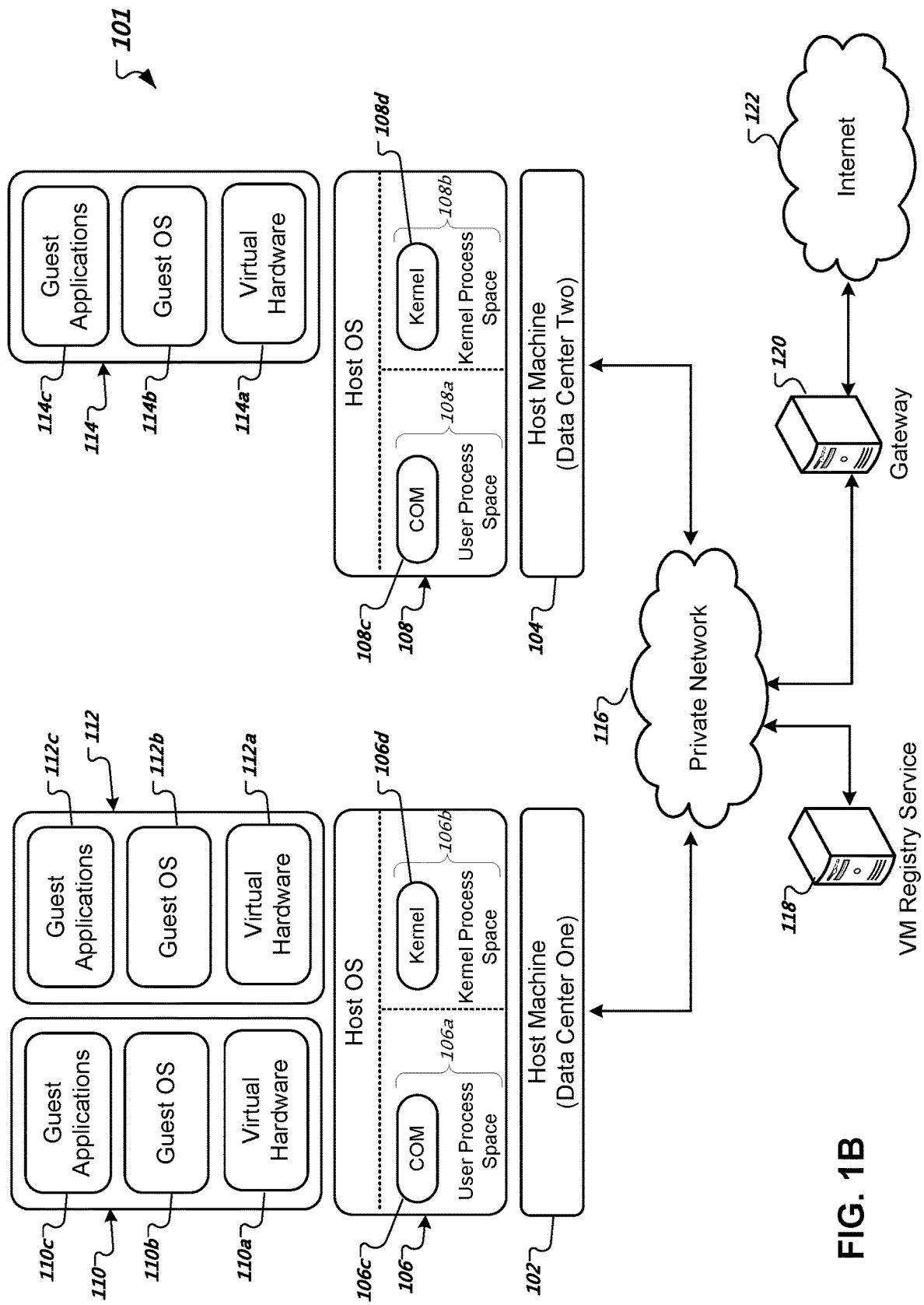
FIG. 1B shows another example of a distributed system that runs multiple virtual machine instances over a geographically distributed virtual network.

FIG. 1B shows another example of a distributed system that runs multiple virtual machine instances over a geographically distributed virtual network. Host machines 102, 104 included in a distributed system 101 can contain one or more data processing apparatuses such as rack mounted servers or other computing devices. Host machines 102, 104 can have different capabilities and computer architectures. Host machines 102, 104 can communicate with each other through a network such as a private network 116 (e.g., dedicated or leased optical fiber or copper wires). Host machines 102, 104 can also communicate with devices on external networks, such as the Internet 122, through one or more gateways 120 which are data processing apparatus responsible for routing data communication traffic between the private network 116 and the Internet 122. Other types of external networks are possible.

The private network 116 can include one or more wired (e.g., Ethernet) or wireless (e.g., WI-FI) networks, for example. In some implementations, the private network 116 includes physical communication assets such as optical fiber or copper wire that connect two data centers. In some implementations, the private network 116 is implemented over an external network such as the Internet 122. In some implementations, data centers have respective local area networks (LANs) that are aggregated together to form a private network 116. IP traffic between data centers can be routed, for example, by using Multiprotocol Label Switching (MPLS). Other types of routing are possible.

Each host machine 102, 104 executes a host operating system 106, 108. A host operating system 106, 108 manages host machine resources. In this example, host operating systems 106, 108 run software that virtualizes the underlying host machine hardware and manages concurrent execution of one or more VMs. For example, the host operating system 106 manages two VMs (VM 110 and VM 112), while a different host operating system 108 manages a single VM 114. A host machine can, in general, manage larger quantities of virtual machines; however, the quantity may be limited based on physical resources of the host machine.

The VMs 110, 112, 114 use a simulated version of an underlying host machine hardware, which can be referred to as virtual hardware (e.g., virtual hardware 110a, 112a and 114a). Software that is executed by the virtual hardware can be referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persistent across VM restarts. In some implementations, virtual disk blocks are allocated on physical disk drives coupled to host machines. VMs can be allocated network addresses through which their respective processes can communicate with other processes via a virtual network. For example, guest software executing on VM 110 can communicate with guest software executing on VM 112 or VM 114 via the virtual network using the allocated network addresses.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system can be an operating system such as a variant of the UNIX operating system. Other operating systems are possible. Each VM can execute the same guest operating system or different guest operating systems. Booting a VM can include using a virtual boot disk to load a kernel image associated with a guest operating system into memory. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c). In some implementations, the communication process executes in the user process space (e.g., user process space 106a) of a host operating system (e.g., host operating system 106). In other implementations, the communication process can execute in the kernel process space (e.g., kernel process space 106d) of the host operating system. There can be a single communication process for all VMs executing on a host machine or multiple communication processes, one for each VM executing on a host machine. In yet further implementations, some portion of the communication process executes in the user process space and another portion executes in the kernel process space. In some implementations, the communication process can use a hardware level encapsulation mechanism.

A communication process 106c, 108c can communicate with a VM registry service 118 to establish a virtual network pair (VNP) between two VMs. In a virtual network, a VNP can be used to route traffic between two endpoints using one or more virtual connections or links. Network traffic associated with the VNP can be carried via a local loop (e.g., if both VMs are on the same host machine) or carried via one or more networks, such as a private network 116, Internet 122, or a combination thereof. For example, a VNP between virtual machine 110 and virtual machine 114 can be used to route packets sent between VNP endpoints managed respectively by first and second communication processes 106c, 108c over the private network 116. In some implementations, a server such as a VM registry server implements the functionality of the VM registry service. The VM registry service 118 can manage assignments of network addresses (e.g., IP addresses) to VMs, and maintain mappings between VM network addresses on a virtual network and the respective network addresses of the host machines running the VMs.

Figure 2:
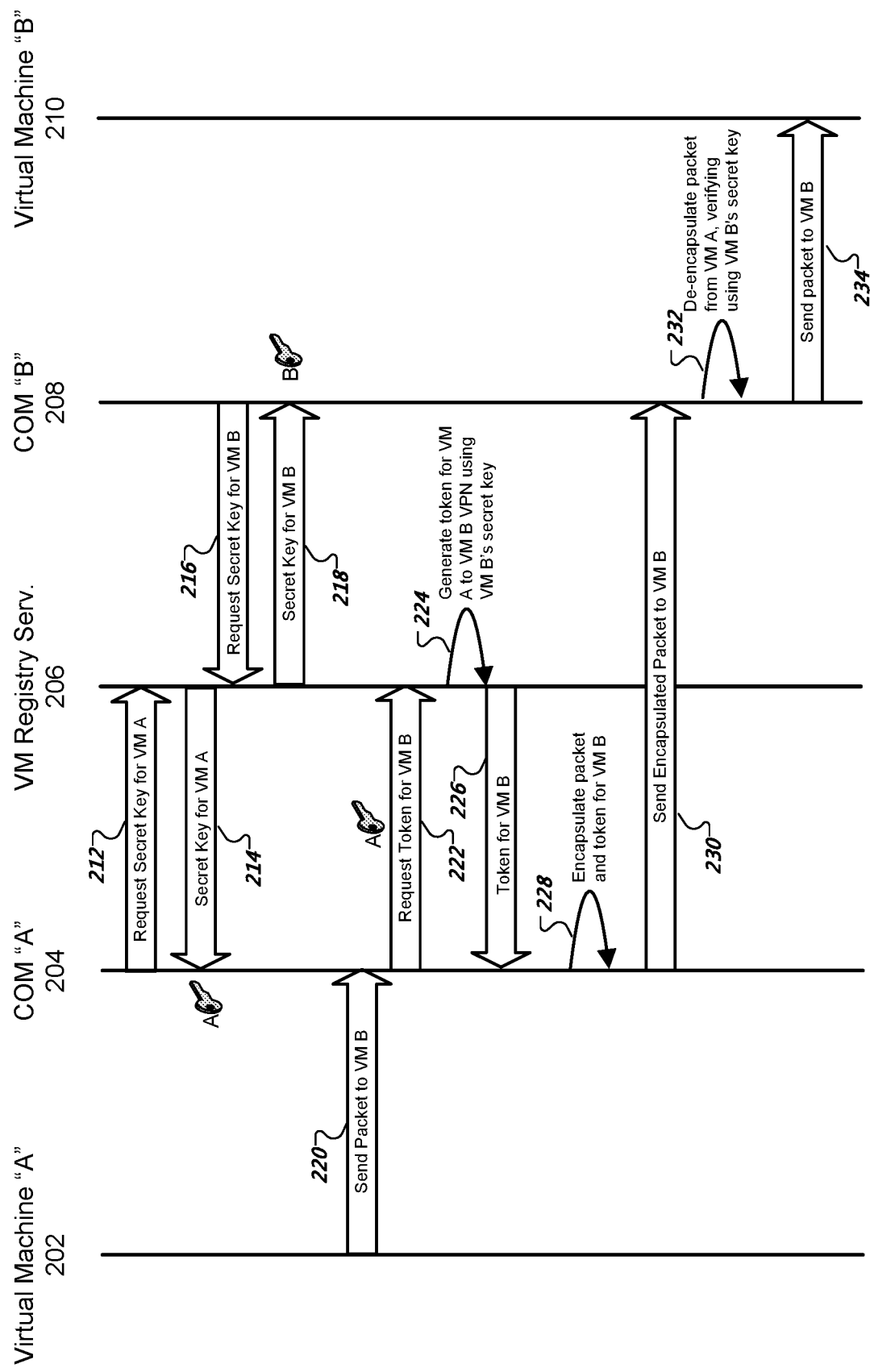
FIG. 2 shows an example of token negotiating and message sending.

FIG. 2 shows an example of token negotiating and message sending. Before a VM can send packets to or receive packets from other VMs, a network agent for a VM can obtain a secret key that corresponds to the VM. In some implementations, a network agent is included in a communication process executing on the VM's host machine.

A secret key is a piece of information that serves to uniquely identify a VM among all VMs associated with a virtual network (e.g., virtual network 140). The secret key can be a number, a string of characters, other data, combinations of these, or any other string of bits of sufficient entropy. The secret key can be generated in such a way that an entity with no prior knowledge of the key has no computationally feasible way of deriving the key. The secret key can be generated using, for example, a cryptographically secure pseudorandom number generator. In some implementations, the secret key is assigned to a VM by a VM registry service. Secret keys can also be assigned by another process besides the VM registry service. A given VM may not know what its secret key is and does not know the secret key of other VMs. In some implementations, a communication process (e.g., communication process 106c) on a given host machine (e.g., host machine 102) keeps track of the secret keys for VMs managed by the host operating system (e.g. host operating system 106).

The communication process 204 (COM A process 204) on VM A 202's host machine can request a secret key for VM A 202 from the VM registry service 206 by sending a message 212 to the VM registry service 206. The request for the secret key can be sent via secure protocol that allows the VM registry service 206 to authenticate which communication process it is communicating with. Other communications between the VM registry service and COM A process 204 or other communication processes can also use the same secure protocol.

The VM registry service 206 responds to the COM A process 204 with a message 214 containing the secret key for VM A. As a further example, the communication process 208 (COM B process 208) on VM B 210's host machine can request a secret key for VM B 210 from the VM registry service 206 by sending a message 216 to the VM registry service 206. The VM registry service 206 responds to the COM B process 208 with a message 218 containing the secret key for VM B.

Before an initial packet from one VM to another is transmitted, a VNP between the two VMs is established. In various implementations, the communication process on a given host machine is responsible for establishing VNPs. For example, communication process 106c is responsible for establishing VNPs for VM 110 and VM 112. Likewise, communication process 108c can do the same for VM 114. Each VM can communicate with one or more other VMs using a separate VNP for each. Referring again to FIG. 2 and by way of example, VM A 202 attempts to transmit a packet 220 to VM B 210. In some implementations, the packet is an IP version 4 or version 6 packet. In other implementations, the packet is an Open Systems Interconnection Reference Model layer 3 or higher protocol packet, such as, for example, UDP, Transmission Control Protocol (TCP), and so on. Other types of packets are possible including, for example, Ethernet packets. The packet is intercepted by the COM A process 204 of the host operating system on which VM A 202 is executing. The COM A process 204 determines that a VNP between VM A 202 and VM B 210 has not yet been established. This being the case, the COM A process 204 requests a token to be used to communicate with VM B 210 from the VM registry service 206. A token is required in order to establish a unidirectional VNP from a source VM to a destination VM. The token request 222 can contain the secret key for VM A 202 and a network address of the destination VM B 210, for example.

In response to the request 222, the VM registry service 206 uses the secret key S_a of VM A 202 to look up or determine the following attributes of VM A 202:

IP_VM_a, the IP address assigned to VM A;

Phys_Port_a, the UDP port assigned to VM A on VM A's host machine;

Phys_IP_a, the IP address of VM A's host machine; and expiry_a_b, the validity period of the token which, in some implementations, is the current time plus a time-to-live (TTL). The TTL can be on the order of minutes (e.g., 10 minutes) or other granularities. In some implementations, expiry_a_b is set to a value (e.g., −1) to indicate that the token never expires. In some implementations, the concatenation of Phys_Port_a and Phys_IP_a can be considered as a VM host address.

In some implementations, the VM registry service 206 verifies that the request 222 was actually transmitted from Phys_IP_a and otherwise denies the request. In further implementations, the VM registry service 206 can consult a traffic policy to determine if VM A 202 should be allowed to communicated with VM B 210 and, if not, denies the request.

In various implementations, the VM registry service 206 computes the token T_a_b for traffic from VM A 202 to VM B 210 as follows (FIG. 2 at 224):

$$T\_a\_b = \text{TruncMAC}(S\_b, \text{Phys\_IP}\_a | \text{Phys\_IP}\_b | \text{Phys\_Port}\_a | \text{Phys\_Port}\_b | \text{IP\_VM}\_a | \text{IP\_VM}\_b | \text{expiry}\_a\_b)$$

where '|' denotes concatenation, S_b is VM B 210's secret key, and TruncMAC is a Message Authentication Code (MAC) function (e.g., a function based on HMAC-SHA1) that has been truncated, for example, to 64 bits. Other MAC functions are possible. In some implementations, all of the fields being concatenated are fixed size, i.e., the concatenation is uniquely determined without the need for separators. Although the fields are concatenated in a certain order, other field orderings are possible. In some implementations, the concatenation of Phys_Port_b and Phys_IP_b can be considered as a VM host address.

In some implementations, a secret key ties a host machine addressing scheme (e.g., <Phys_IP, Phys_Port>) to a VNP addressing scheme (e.g., IP address of VM on a virtual network). In some implementations, a secret key ties a host machine addressing scheme (e.g., <Phys_IP, Phys_Port>) to a memory region associated with a VM via remote direct memory access (RDMA).

The VM registry service 206 returns the tuple (Phys_IP_b, Phys_Port_b, T_a_b, expiry_a_b) to COM A process 204 in a response 226 to the request 222, where Phys_IP_b is the IP address of the host machine on which VM B 210 is executing and Phys_Port_b is the UDP port on VM B's host machine that has been reserved for receiving traffic directed to VM B 210. Once the COM A process 204 receives the tuple, the packet 220 can be encapsulated, at 228.

At 230, the encapsulated packet is transmitted to VM B's host machine using the Phys_IP_b and Phys_Port_b as the destination address of the packet. Future packets destined for VM B 210 can reuse the tuple information until expiry_a_b has passed. Once the expiry_a_b has passed (if it is not set to a value indicating that the token never expires), a new token can be obtained as described above, for example. For VM B 210 to send packet to VM A 202, a token can be used to establish a unidirectional VNP from VM B 210 to VM A 202. The same process can be followed as outlined above or, alternatively, a packet sent from VM A to VM B can include the token.

The encapsulated packet is received by the destination host machine for VM B 210 where it is intercepted by the COM B process 208. At 232, the COM B process 208 de-encapsulates the packet and verifies it based on VM B's secret key. At 234, the communication process 208 the COM B process sends the de-encapsulated packet to VM B 210. This can be done by injecting the IP packet into the network stack as an Ethernet frame, for example.

Figure 3:
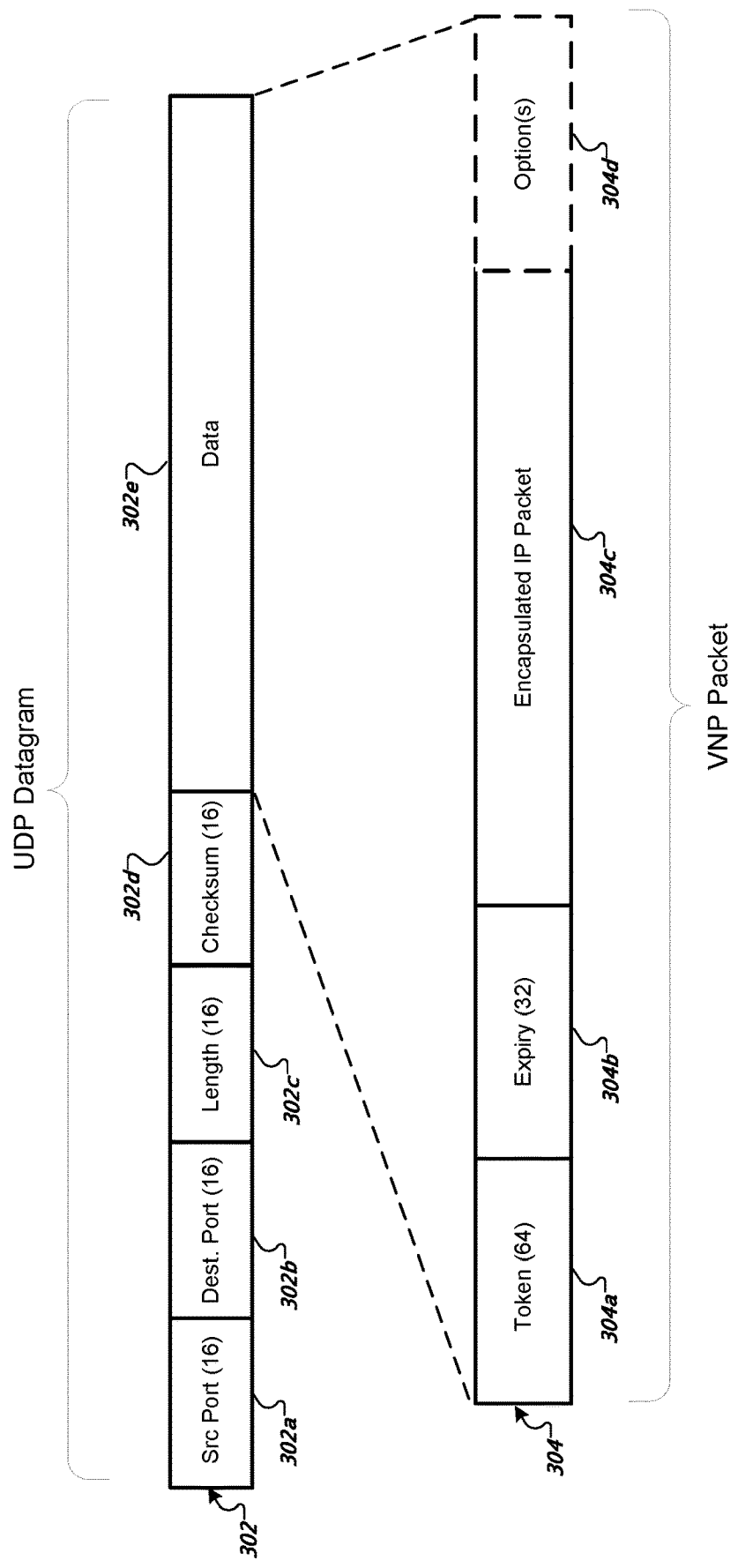
FIG. 3 shows an example of an encapsulated packet.

FIG. 3 shows an example of an encapsulated packet. A communication process can receive an outgoing packet generated by a VM. The outgoing packet is encapsulated in a data portion 302e of a UDP packet 302. In other words, the data portion 302e includes an encapsulated packet, such as an encapsulated IP packet 304c, that includes the outgoing packet.

The UDP packet 302 contains a header that includes a source port number 302a (16 bits), a destination port number 302b (16 bits), a length field 302c (16 bits) which is the length of the data portion 302e, and a checksum 302d (16 bits). In various implementations, the source port 302a is set to Phys_Port_a and the destination port 302b is set to Phys_Port_b. The data portion 302e is variable length and contains the outgoing packet. In some implementations, the data portion 302e can be encrypted. Symmetric or asymmetric encryption key algorithms can be used to encrypt some or all of the data portion 302e, for example. The encryption keys can be distributed by a VM registry service, e.g., VM registry service 118 of FIG. 1B. In some implementations, a conventional key negotiation protocol, e.g., the Diffie-Hellman protocol, can be used in an encryption of the data portion 302e.

The UDP packet's data portion 302e contains a VNP packet 304. A VNP packet 304 can include the token T_a_b 304a (64 bits), the expiry time expiry_a_b 304b (32 bits), the outgoing packet 304c (variable length), and an optional options field 304d (variable length). Other lengths for the VNP packet fields are possible. In addition, the fields of the VNP packet 304 can occur in a different order than that which is illustrated in FIG. 3. In some implementations, the outgoing packet is an IP packet. Other outgoing packet types are possible including, for example, Ethernet packets. Once encapsulation is complete, the communication process or another process on the respective host machine's operating system can transmit the UDP packet 302 in an IP packet with a source IP address of Phys_IP_a and a destination IP address of Phys_IP_b. Alternatively, the encapsulated packet can be transmitted using a different protocol.

In some implementations, the VNP packet 304 includes an options field 304d. The options field 304d allows a sending VM to convey additional information to a receiving VM. If the encapsulated packet is a UDP packet, as illustrated in FIG. 3, the length of the options field can be calculated based on the difference of the value specified in the length 302c field and the combined size of the token 304a, expiry 304b, and encapsulated IP packet 304c fields. The size of the encapsulated IP packet 304c is available in the header of the packet 304c. The options field 304d can be omitted from the VNP packet 304 if its inclusion would push the size of the encapsulated packet (e.g., UDP packet 302) above the maximum transmission unit (MTU) which would result in packet fragmentation. In further implementations a field such as a bit flag, for example, can be added to the VNP packet 304 to indicate the presence of an options field 304d.

The options field 304d can be used to send a return VNP token T_b_a to the receiving VM in order to avoid the receiving VM having to obtain a token in order to reply to the sending VM. The COM A process 204 for VM A 202 has all information on hand that is needed to compute T_b_a; in particular, the token is signed with VM A 202's secret key S_a. The return token T_b_a can likely be included in the first packet sent between VM A 202 and VM B 210 since, in the case of TCP, the first packet is a small SYN packet which leaves sufficient room for the options field 304d containing the return token without the resulting encapsulated packet exceeding MTU. The options field 504d can also be used to send various protocol extensions, to exchange encryption keys, to send control flow information, and so on.

Figure 4:
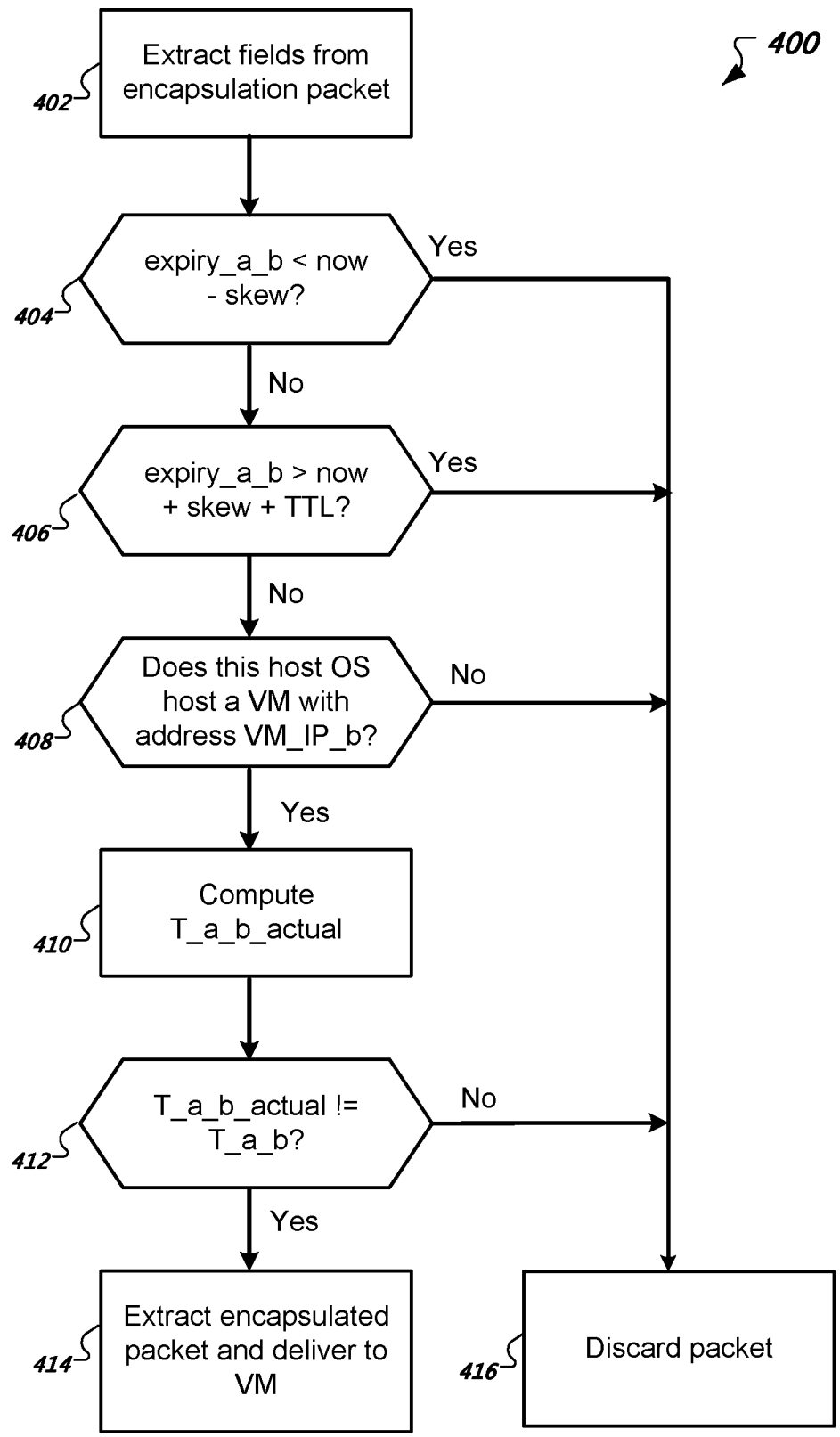
FIG. 4 shows an example of a technique for packet de-encapsulation.

FIG. 4 shows an example of a technique 400 for packet de-encapsulation as can be performed by the communication process 208 or another process on the destination host machine. The de-encapsulation process can be performed without the need to communicate with the VM registry service 118. With reference to FIG. 2, when an encapsulated packet is received fields from the packet are extracted in order to validate the packet (step 402). The source and destination IP addresses and ports of the UDP packet are extracted: Phys_IP_a, Phys_IP_b, Phys_Port_a, and Phys_Port_b. The source and destination address of the encapsulated IP datagram are also extracted: IP_VM_a, IP_VM_b. Finally, the token and expiry are extracted from the encapsulation header: T_a_b and expiry_a_b.

If expiry_a_b is less than the current time minus a skew (step 404), the encapsulated packet is discarded (step 416). In some implementations, the skew is an estimate of likely clock skew between host machine clocks (e.g., a few seconds). The skew can be set to zero if host machine clocks are synchronized. Otherwise, if expiry_a_b is greater than the current time plus skew and TTL (step 406), the encapsulated packet is also discarded (step 416). A check is performed to verify whether the host operating system is hosting a VM having the address VM IP b (step 408). If not, the encapsulated packet is discarded (step 416). The extracted fields and VM B 210's secret key S_b are used to calculate T_a_b_actual as follows (step 410):

$$T\_a\_b\_actual=TruncMAC(S\_b, Phys\_IP\_a|Phys\_IP\_b|Phys\_Port\_a|Phys\_Port\_b|IP\_VM\_a|IP\_VM\_b|expiry\_a\_b).$$

T_a_b_actual is then compared to the token T_a_b from the encapsulated packet (step 412). If T_a_b_actual is the same as T_a_b then the encapsulated packet (e.g., encapsulated IP packet 304c) is extracted from the encapsulated packet (e.g., encapsulated packet 302) and is delivered to VM B 210 (step 414). Otherwise, the encapsulated packet is discarded (step 416).

A gateway (e.g., gateway 120) can serve as an encapsulation gateway to allow virtual machines on a virtual network to communicate with endpoints on an external network such as the Internet. A host machine can send encapsulated packets to the gateway. When the gateway receives encapsulated packet from a VM destined for the external network, the gateway can validate the token of the VNP packet. If the token validation fails, the packet is discarded. If validation succeeds, the encapsulated packet is de-encapsulated and the encapsulated packet is extracted and injected into the gateway's network stack where it is subject to normal routing.

Upon receiving, from the external network, a non-encapsulated packet destined for a VM, the gateway obtains a token for the destination of the packet and then encapsulates the packet. In some implementations, obtaining a token can include communicating with a VM registry service. In some implementations, obtaining a token can include retrieving a token from a local cache of tokens. The gateway 120 then transmits the encapsulated packet to the destination VM's host machine.

If a communication process associated with a VM queries a VM registry service for a token that is for a destination computer that is not on the virtual network, the VM registry service responds with a tuple (Phys_IP_b, Phys_Port_b, T_a_b, expiry_a_b) where Phys_IP_b, Phys_Port_b and T_a_b are for the gateway, rather than the ultimate destination, so that the VM's packets are routed through, and de-encapsulated by, the gateway. In some implementations, the VM can use this tuple to send packets to any destination on an external network thus avoiding having to obtain a tuple from the VM registry service for each unique destination.

Figure 5:
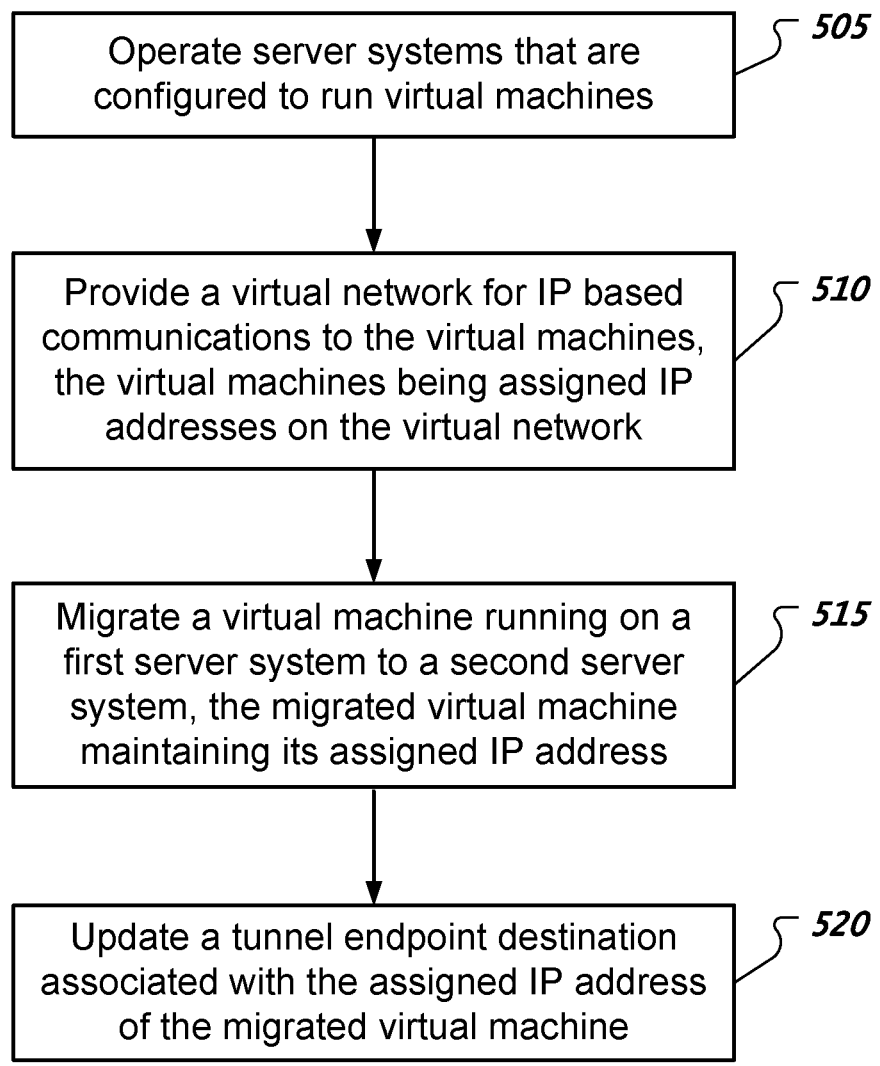
FIG. 5 shows an example of a distributed system process that includes virtual machine migration.

FIG. 5 shows an example of a distributed system process that includes virtual machine migration. A distributed system can include multiple server systems. At 505, a distributed system process includes operating server systems that are configured to run virtual machines. Such server systems can reside in different geographic locations. A server system can include one or more host machines. Operating server systems can include sending control messages to boot virtual machines on one or more machines. Operating server systems can include running a scheduling routine configured to distribute a compute load between one or more virtual machines.

At 510, the distributed system process includes providing a virtual network for IP based communications to the virtual machines, the virtual machines being assigned IP addresses on the virtual network. Providing the virtual network can include using separate IP tunnels to effect delivery of IP packets to the virtual machines, respectively. Providing the virtual network can include using a first network agent to encapsulate an IP packet sent by a first virtual machine and to send the encapsulated IP packet via an IP tunnel. Providing the virtual network can include using a second network agent to receive the encapsulated IP packet via the IP tunnel and to deliver a version of the encapsulated IP packet to a second virtual machine.

At 515, the distributed system process includes migrating a virtual machine running on a first server system to a second server system, the migrated virtual machine maintaining its assigned IP address. Migrating the virtual machine can include sending virtual machine state information associated with the migrated virtual machine to the second server system. Migrating the virtual machine can include operating the second server system to resume operations of the migrated virtual machine using the virtual machine state information. The distributed system process can include selecting a virtual machine to migrate based on a detection of an event such as a hardware failure event, a processing load event, or a migration command that identifies one or more virtual machines for migration.

At 520, the distributed system process includes updating a tunnel endpoint destination associated with the assigned IP address of the migrated virtual machine. The updated tunnel endpoint destination can be based on a network address associated with the second server system. In some implementations, updating a tunnel endpoint destination includes sending information to a VM registry service, the information indicating the new home (e.g., new server system) of the migrated virtual machine.

In some implementations, migrating a virtual machine can include forwarding network traffic for a duration of time. For example, migrating the virtual machine can include operating the first server system to continue to receive one or more inbound IP packets via the virtual network for the migrated virtual machine and operating the first server system to send the one or more inbound IP packets to the migrated virtual machine using an IP tunnel that is based on the updated tunnel endpoint destination.

A distributed system can provide a high-availability capability. Pairs of virtual machines can be run on separate host machines, where one of the virtual machines mirrors the other. In some implementations, a system runs primary and secondary VMs in lock step with mirrored state. If one of the virtual machine fails unexpectedly, the other virtual machine takes over. In some implementations, a host machine process that controls a primary VM of a VM pair sends periodic state information updates of the primary VM to a host machine process that controls a secondary VM of the VM pair. The primary and secondary host machine processes can exchange heartbeat messages, and based on a lack of receiving a heartbeat message, the secondary host machine processes can cause primary VM traffic on a virtual network to be rerouted to the secondary VM and cause the secondary VM to become active. Migrating the virtual machine can include activating a secondary VM based on a lack of receiving a heartbeat message. In some implementations, migrating a virtual machine includes migrating the virtual machine to a new physical endpoint on the same host machine.

Figure 6:
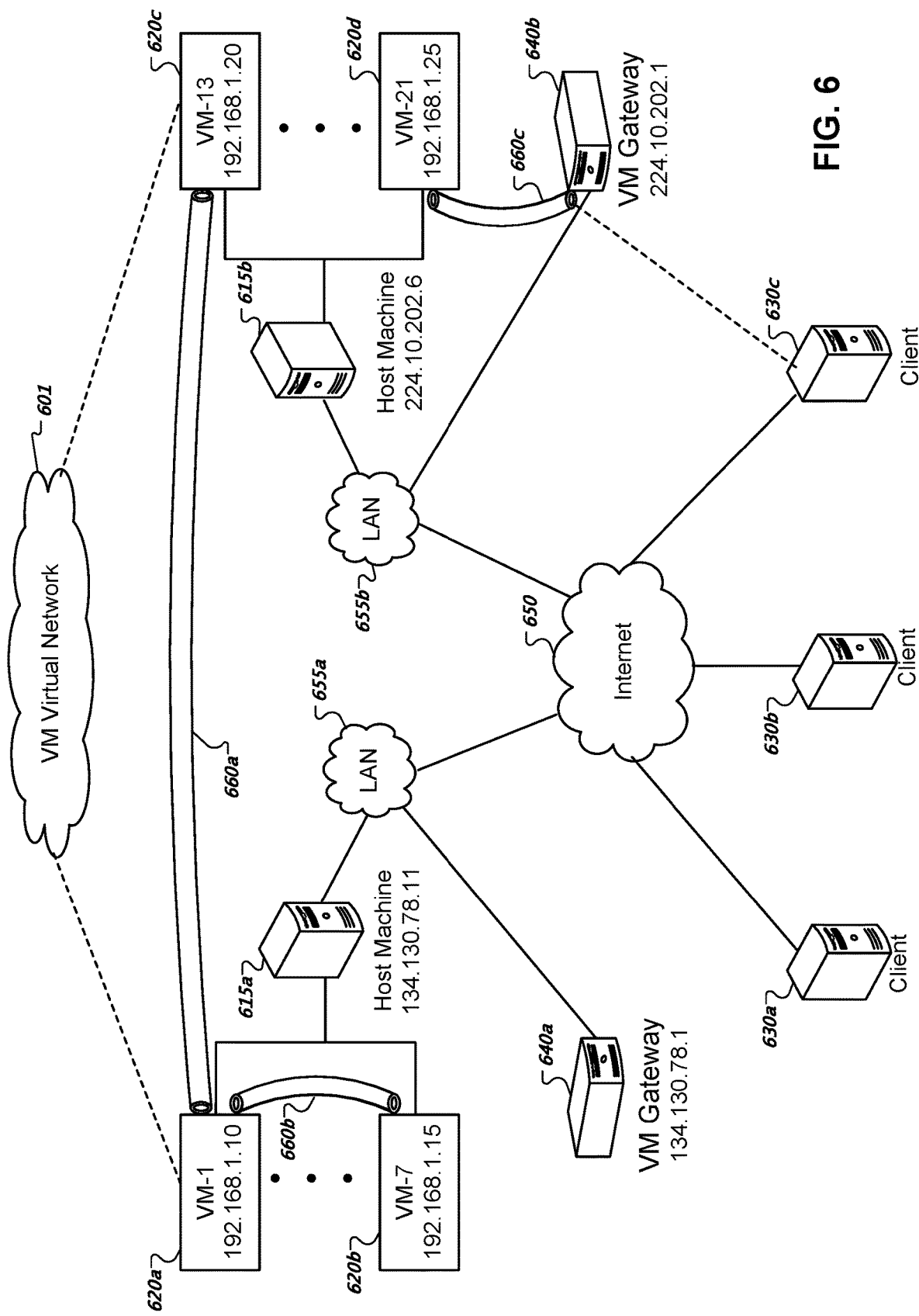
FIG. 6 shows an example of a networking architecture for a distributed system configured to run virtual machines.

FIG. 6 shows an example of a networking architecture for a distributed system configured to run virtual machines. A distributed system can contain server systems that include host machines 615a, 615b, which are configured to run one or more virtual machines 620*a*, 620*b*, 620*c*, 620*d*. Host machines 615*a*, 615*b* use IP tunnels 660*a*, 660*b*, 660*c* to carry IP traffic between virtual machines 620*a-d* and IP traffic between the virtual machines 620*a-d* and VM gateways 640*a*, 640*b*. The VM gateways 640*a, b* are configured to provide Internet 650 access to the virtual machines 620*a-d*.

The host machines 615*a*, 615*b* can connect to the Internet 650 via respective local area networks (LANs) 655*a*, 655*b*. In some implementations, host machines 615*a*, 615*b* are assigned IP addresses (e.g., 134.130.78.11, 224.10.202.6) that are visible on the Internet 650. Traffic on an inter-host-machine IP tunnel 660*a* (e.g., IP tunnel packets) can be routed from the host machine 615 on a first LAN 655*a* to a host machine 615*b* on a second LAN 655*b* via the Internet 650 (tunnel 660*a* carries traffic between VM-1 620*a* and VM-13 620*c*). Traffic on an intra-host-machine IP tunnel 660*b* can be routed completely inside a host machine 615*a*.

The VM gateway 640*a*, 640*b* can route traffic between the Internet 650 and the virtual network 601 by changing source or destination address information in packet headers so that the address space of the virtual network 601 is hidden behind the IP address of the gateway 640*a*,640*b*. In particular, packets arriving at the gateway 640*a*,640*b* from the Internet 650 and bound for the virtual network 601 have their IP datagram destination address changed from that of the gateway 640*a*, 640*b* (e.g., 134.130.78.1, or 224.10.202.1) to the IP address of a destination VM (e.g., 192.168.1.10). Packets arriving at the gateway 640*a*, 640*b* from the virtual network 601 and bound for the Internet 650 have their IP source address changed from that of a VM (e.g., 192.168.1.10) to the IP address of the VM gateway 640*a*, 640*b* visible on the Internet 650 (e.g., 134.130.78.1, 224.10.202.1). Based on the virtual network 601 using a private subnet, the VM gateways 640*a, b* can perform network address translation (NAT) to translate between private subnet addresses and public addresses.

Virtual machines 620*a*, 620*b*, 620*c*, 620*d* running on the host machines 615*a-b* can run processes such as webserver processes that interact with browser software running on clients 630*a*, 630*b*, 630*c*. A client can be a data processing apparatus such as, for example, a server, a personal computer, a laptop computer, a smart phone, an embedded device (e.g., a smart power meter), or a tablet computer. In this example, client 630*c* communicates with a VM (e.g., VM-21 620*d*) by sending IP packets to a VM gateway 640*b*. In turn, the VM gateway 640*b* encapsulates the packets from the client 630*c* and sends the encapsulated packets to the host machine 615*b* running VM-21 620*d* via an IP tunnel 660*c*. The host machine 615*b* running VM-21 620*d* can de-encapsulate the packets and deliver the packets to VM-21 620*d*.

FIGS. 7A and 7B show different snapshots of an example virtual network routing table. Machines such as host machines 615*a*, 615*b* and VM gateways 640*a*, 640*b* can use a virtual network routing table to determine where to send a packet having a destination on the virtual network 601. Tunnel endpoint destinations can be determined based on the virtual network routing table. In this example, a virtual machine 620*b* with identifier VM-7 is being migrated from a first host machine 615*a* to a second host machine 615*b*. In some implementations, a controller (not shown) can be used to migrate a selected virtual machine from the first host machine 615*a* to the second host machine 615*b*. A controller can be a server system that includes one or more processors. In some implementations, a host machine includes a controller.

FIG. 7A shows a before-migration snapshot of a virtual network routing table. The virtual network routing table 710 includes routing entries for respective virtual machines. For example, the virtual network routing table 710 includes an entry for VM-7 that directs virtual network traffic to VM-7 (e.g., IP packets with a destination IP address that corresponds to the IP address assigned to VM-7) to the first host machine 615*a*. The entry for VM-7 includes an Internet IP address assigned to the first host machine 615*a* and a port value that is assigned to VM-7.

FIG. 7B shows an after-migration snapshot of a virtual network routing table. Based on the migration of VM-7 from the first host machine 615*a* to the second host machine 615*b*, the updated virtual network routing table 720 shows that the new entry for VM-7 includes the Internet IP address assigned to the second host machine 615*b* and a port value that is assigned to VM-7. Note that a port value assigned to a VM can change during a migration, as port value assignments can be controlled by the host machine.

Figure 8:
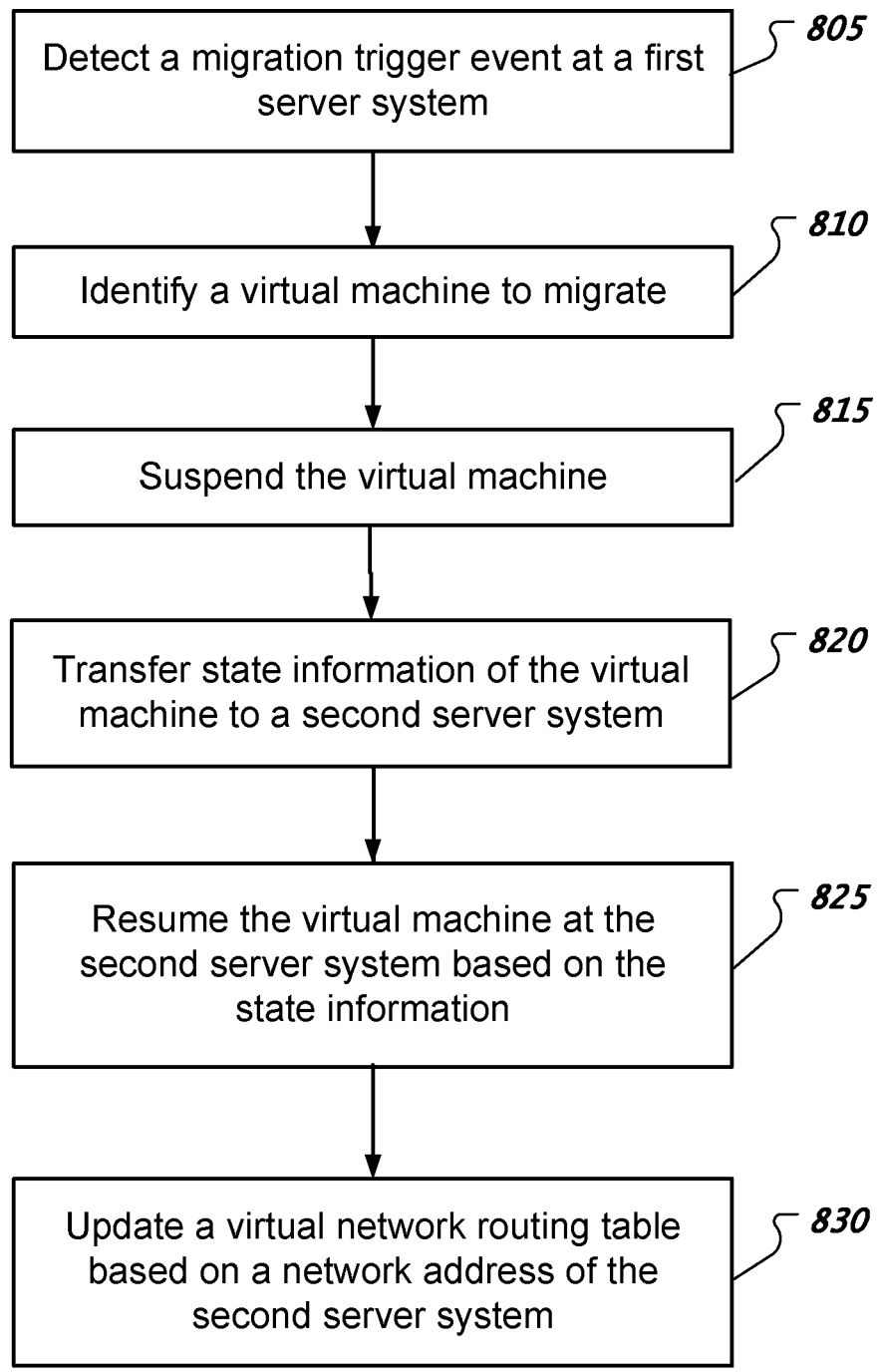
FIG. 8 shows an example of a migration process for virtual machines communication via a virtual network.

FIG. 8 shows an example of a migration process for virtual machines communication via a virtual network. A distributed system can run a migration process. A migration process can be a distributed process running on one or more processors, servers, or a combination thereof. At 805, a migration process detects a migration trigger event at a first server system. Various examples of a migration trigger event include a planned outage, hardware failure (e.g., a failed or failing hard drive), resource utilization overcapacity (e.g., processor utilization overcapacity, network utilization overcapacity), or an explicit migration command. For example, an administrator may need to shut down a server system to perform maintenance (e.g., replace a piece of hardware in the server system or install software updates to a host operating system) or system upgrades. The administrator can issue one or more commands to a host machine to migrate one or more virtual machines that are running on the host machine. In some implementations, virtual machines running on a host machine can be migrated to different host machines to distribute the processing load. In some implementations, detecting a migration trigger event includes detecting a reduced processing capacity at a server system.

At 810, the migration process identifies a virtual machine to migrate. In some cases, the identified machine is indicated by the migration trigger event. For example, a migration trigger message can indicate that a physical machine is failing (e.g., experiencing an increased number of hard-drive errors, or an increased operating temperature). Identifies a virtual machine to migrate can include determining all of the virtual machines that are running on a failing physical machine. For load balancing, identifying a virtual machine to migrate can include selecting a virtual machine based on real-time performance monitoring. Performance monitoring can include monitoring disk usage, network usage, and CPU usage. Other types of monitoring are possible. At 815, the migration process suspends the virtual machine. Suspending the virtual machine can include writing the state information of the virtual machine (e.g., memory state, CPU state, register state, network packet buffers, etc.) to one or more files. In some cases, a suspend signal can be communicated to the virtual machine to allow the virtual machine to complete one or more operations before it is suspended.

At 820, the migration process transfers state information of the virtual machine to a second server system. Transferring state information can include sending one or more files to the second server system via a network connection. At 825, the migration process resumes the virtual machine at the second server system based on the state information. The second server system can initialize a local virtual machine process (e.g., initialize memory, CPU states, register states, network packet buffers, etc.) with the state information. The resumed virtual machine can continue with network communications using the same IP address that it was using when running at the first server system. In an example, the resumed virtual machine, at the second server system, can process and respond to a network packet received when the virtual machine was running at the first server system.

At 830, the migration process updates a virtual network routing table based on a network address of the second server system. Based on the update, traffic for the virtual machine is sent to the second server system. Updating a virtual network routing table can include sending an update message to one or more gateways.

In some implementations, the migration process includes forwarding virtual network traffic for the virtual machine received at the first server system to the second server system. In some implementations, the second server system runs a backup virtual machine that is synchronized to the virtual machine running on the first server system. Migrating the virtual machine can include activating the backup virtual machine.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    obtaining, at a host machine, a tunnel packet that includes a token, an expiry representing a validity period for the token, and an encapsulated packet, the token required to establish a communication link including a unidirectional virtual network pair with a destination virtual machine, the encapsulated packet including a virtual machine address for the destination virtual machine;
    determining, by the host machine, whether the tunnel packet is valid based on the expiry and a current time;
    determining, by the host machine, whether the host machine hosts the destination virtual machine with the virtual machine address;
    determining whether the token matches the expiry indicated by the tunnel packet and the virtual machine address for the destination virtual machine indicated by the encapsulated packet wherein determining whether the token matches the expiry indicated by the tunnel packet and the virtual machine address for the destination virtual machine indicated by the encapsulated packet comprises: generating a second token based on the expiry indicated by the tunnel packet and the virtual machine address indicated by the encapsulated packet; and determining that the token and the second token match; and
    in response to determining the tunnel packet is valid, the host machine hosts the destination virtual machine, and the token matches the expiry, providing the encapsulated packet to the destination virtual machine; or
    in response to determining the tunnel packet is invalid, the host machine discards the tunnel packet.

2. The method of claim 1, wherein generating a second token based on the expiry indicated by the tunnel packet and the virtual machine address for the destination virtual machine indicated by the encapsulated packet comprises:
    determining the expiry from the tunnel packet; and
    determining the virtual machine address from the encapsulated packet.

3. The method of claim 1, wherein generating a second token based on the expiry indicated by the tunnel packet and the virtual machine address for the destination virtual machine indicated by the encapsulated packet comprises generating the second token based on a hash of the expiry indicated by the tunnel packet and the virtual machine address indicated by the encapsulated packet.

4. The method of claim 1, wherein generating a second token based on the expiry indicated by the tunnel packet and the virtual machine address for the destination virtual machine indicated by the encapsulated packet comprises generating the second token based on (i) an Internet Protocol (IP) address of the host machine indicated by the tunnel packet and (ii) an IP address of a source virtual machine indicated by the encapsulated packet.

5. The method of claim 1, wherein determining, by the host machine, whether the host machine hosts the destination virtual machine with the virtual machine address comprises:
  determining an IP address of the destination virtual machine from the encapsulated packet; and
  determining whether the host machine hosts a respective virtual machine with the IP address of the destination virtual machine.

6. The method of claim 1, wherein determining, by the host machine, whether the tunnel packet is valid based on the expiry and a current time comprises determining whether the expiry is less than a current time minus a skew.

7. The method of claim 1, wherein providing the encapsulated packet to the destination virtual machine comprises providing the encapsulated packet to the destination virtual machine without the expiry and without the token.

8. The method of claim 1, wherein the tunnel packet comprises a user datagram protocol (UDP) packet.

9. A system comprising:
  one or more processors and one or more storage devices storing instructions that are operable, when executed by the one or more processors, to cause the one or more processors to perform operations comprising:
    obtaining, at a host machine, a tunnel packet that includes a token, an expiry representing a validity period for the token, and an encapsulated packet, the token required to establish a communication link including a unidirectional virtual network pair with a destination virtual machine, the encapsulated packet including a virtual machine address for the destination virtual machine;
    determining, by the host machine, whether the tunnel packet is valid based on the expiry and a current time; determining, by the host machine, whether the host machine hosts the destination virtual machine with the virtual machine address;
    determining whether the token matches the expiry indicated by the tunnel packet and the virtual machine address for the destination virtual machine indicated by the encapsulated packet, wherein determining whether the token matches the expiry indicated by the tunnel packet and the virtual machine address for the destination virtual machine indicated by the encapsulated packet comprises: generating a second token based on the expiry indicated by the tunnel packet and the virtual machine address indicated by the encapsulated packet; and determining that the token and the second token match; and
    in response to determining the tunnel packet is valid, the host machine hosts the destination virtual machine, and the token matches the expiry, providing the encapsulated packet to the destination virtual machine; or
    in response to determining the tunnel packet is invalid, the host machine discards the tunnel packet.

10. The system of claim 9, wherein generating a second token based on the expiry indicated by the tunnel packet and the virtual machine address for the destination virtual machine indicated by the encapsulated packet comprises:
  determining the expiry from the tunnel packet; and
  determining the virtual machine address from the encapsulated packet.

11. The system of claim 10, wherein generating a second token based on the expiry indicated by the tunnel packet and the virtual machine address for the destination virtual machine indicated by the encapsulated packet comprises generating the second token based on a hash of the expiry indicated by the tunnel packet and the virtual machine address indicated by the encapsulated packet.

12. The system of claim 9, wherein generating a second token based on the expiry indicated by the tunnel packet and the virtual machine address for the destination virtual machine indicated by the encapsulated packet comprises generating the second token based on (i) an Internet Protocol (IP) address of the host machine indicated by the tunnel packet and (ii) an IP address of a source virtual machine indicated by the encapsulated packet.

13. The system of claim 9, wherein determining, by the host machine, whether the host machine hosts the destination virtual machine with the virtual machine address comprises:
  determining an IP address of the destination virtual machine from the encapsulated packet; and
  determining whether the host machine hosts a respective virtual machine with the IP address of the destination virtual machine.

14. The system of claim 9, wherein determining, by the host machine, whether the tunnel packet is valid based on the expiry and a current time comprises determining whether the expiry is less than a current time minus a skew.

15. The system of claim 9, wherein providing the encapsulated packet to the destination virtual machine comprises providing the encapsulated packet to the destination virtual machine without the expiry and without the token.

16. The system of claim 9, wherein the tunnel packet comprises a user datagram protocol (UDP) packet.

17. A non-transitory computer-readable medium storing software comprising instructions executable by one or more computers which, upon such execution, cause the one or more computers to perform operations comprising:
  obtaining, at a host machine, a tunnel packet that includes a token, an expiry representing a validity period for the token, and an encapsulated packet, the token required to establish a communication link including a unidirectional virtual network pair with a destination virtual machine, the encapsulated packet including a virtual machine address;
  determining, by the host machine, whether the tunnel packet is valid based on the expiry and a current time;
  determining, by the host machine, whether the host machine hosts the destination virtual machine with the virtual machine address;
  determining whether the token matches the expiry indicated by the tunnel packet and the virtual machine address for the destination virtual machine indicated by the encapsulated packet, wherein determining whether the token matches the expiry indicated by the tunnel packet and the virtual machine address for the destination virtual machine indicated by the encapsulated packet comprises: generating a second token based on the expiry indicated by the tunnel packet and the virtual machine address indicated by the encapsulated packet; and determining that the token and the second token match; and
  in response to determining the tunnel packet is valid, the host machine hosts the destination virtual machine, and the token matches the expiry, providing the encapsulated packet to the destination virtual machine; or
  in response to determining the tunnel packet is invalid, the host machine discards the tunnel packet.

* * * * *